United States Patent [19]

Statham et al.

[11] Patent Number: 4,636,389

[45] Date of Patent: Jan. 13, 1987

[54] BREWING AND DISTILLING

[75] Inventors: Roger Statham, Lymm; John F. Taylor, Hale, both of England

[73] Assignee: Edward Billington & Son Limited, Liverpool, England

[21] Appl. No.: 643,361

[22] Filed: Aug. 22, 1984

[30] Foreign Application Priority Data

Sep. 2, 1983 [GB] United Kingdom ................. 8323656

[51] Int. Cl.$^4$ .......................... C12C 11/04; C12C 9/00
[52] U.S. Cl. ........................................ 426/11; 426/13; 426/16
[58] Field of Search ............................. 426/11, 13, 16

[56] References Cited

U.S. PATENT DOCUMENTS

| 3,576,645 | 4/1971 | Rozsa | 426/11 |
| 4,165,388 | 8/1979 | Witt | 426/16 |
| 4,397,872 | 8/1983 | Stubits et al. | 426/16 |

FOREIGN PATENT DOCUMENTS

| 0138356 | 4/1986 | European Pat. Off. | 426/16 |
| 2934464 | 3/1981 | Fed. Rep. of Germany | 426/11 |
| 0952954 | 8/1982 | U.S.S.R. | 426/11 |

Primary Examiner—Jeanette Hunter
Attorney, Agent, or Firm—Staas & Halsey

[57] ABSTRACT

A process of brewing wherein malt is replaced, at least in part, by an extruded starch product and a process of distilling for the production of whisky wherein grain is replaced, at least in part, by an extruded starch product.

12 Claims, No Drawings

BREWING AND DISTILLING

DESCRIPTION

The present invention concerns improvements in brewing and distilling.

It is well known that cereals such as, for example, barley, rice, maize, wheat, rye and milo are used in the brewing process either in their natural condition or processed for example as flaked wheat or flaked barley, to extend the malt with a view to reducing costs of raw materials and such products are termed "adjuncts".

The efficiency of such adjuncts is known to vary and such variation is due to the amount of starch present in the adjunct and to its availability i.e., the susceptibility of the starch to enzyme action. Such availability can be increased by heat treatment in the form of roasting, torrefying or steaming the grain and there are a number of techniques for carrying out such heat treatment.

In the manufacture of animal feedstuff it is known to extrude and cook cereals in order to increase digestability. It would be expected that if such products were used in brewing as adjuncts that the starch in the cereals would be more easily converted to alcohol.

On the other hand it would also be expected that the cereal would have had to be de-germed and de-glutenized, at least in part, otherwise the lipids and to some extent the proteins present would tend to reduce frothing and froth retention which would mean that the beer would not have a head and also because of the proteins that the beer would be difficult to clear.

Degerming is an expensive process and we have found unexpectedly that it is not necessary and that these problems are not encountered if the malt customarily used in making beer is replaced, at least in part, by an extruded starch product.

According to the present invention therefore a process of brewing is provided in which malt is replaced, at least in part, by an extruded starch product.

By "extruded starch product" we mean a starch product that has been passed through an extruder cooker, such as made by Wenger, Anderson's Koppers and Creuset-Loire, to attain a temperature of from 60° C. to 180° C. and at a moisture content of from 12% to 30% by weight.

The extrusion is preferably carried out under a pressure of at least 3 bars (atmospheres), for example 3 to 20 bars, and more preferably at least 50 bars, for example, 50 to 70 bars.

The extruded starch product can be, for example, extruded complete or incomplete (e.g. de-germed or de-glutenized) seeds of cereals, tapioca (manioc) or potato. The starch product can be extruded in the presence of at least one other material, e.g. bentonite, non-bentonite clay or molasses all of which increase friction and raise the temperature during extrusion. If bentonite is used it has the additional advantage that it acts as an aid in clearing the beer. Examples of suitable cereals are maize, wheat, rice, barley, rye and milo.

It is preferred to use the extruded starch product to replace only part of the malt. It could be used, however, to replace the malt completely but in this case enzymes would need to be added to replace those present in the malt to break down the disaccharides to simple sugars.

By replacing at least part of the malt with our extruded starch product the process of brewing is made cheaper and may also result in a more efficient conversion to alcohol. This applies even where the temperature of extrusion is as low as 60° C. If however the temperature of extrusion is higher than 130° C. and if one increases the degree of shear then there is an increase in the yield of alcohol to a level above that experienced when a starch product which has simply been steam or heat treated is used as the adjunct and indeed it is possible to match or even exceed the yield of alcohol obtained with pure malt.

For the major benefits described in this application it is necessary to achieve maltose contents of above 200 mg maltose/g sample in the dry extruded starch product. As determined by the ferricyanide method referred to below which gives values that are then adjusted to grain dry matter and reflect the number of milligrams of maltose per gram of dry matter. Theoretically a maltose value of approximately 240 represents complete cooking and gelatinization.

The following Table sets out the results of specific tests.

| Test No. | Material | S.G. Wort | Yield in Gallons | Head Test (Sigma seconds) | Maltose |
|---|---|---|---|---|---|
| 1. | 3.2 kg Malt 0.8 kg Flaked maize | 1.042 | 4.75 | 138 | — |
| 2. | 4 kg Malt | 1.040 | 4.75 | 132 | — |
| 3. | 3.2 kg Malt 0.8 kg extruded maize | 1.041 | 4.50 | 149 | 270 |
| 4. | 4 kg Malt | 1.038 | 5.50 | 158 | — |
| 5. | 3.2 kg Malt 0.8 kg extruded wheat | 1.037 | 5.66 | 145 | 242 |
| 6. | 3.2 kg Malt 0.8 kg extruded maize | 1.038 | 5.9 | — | 270 |
| 7. | 3.2 kg Malt 0.8 kg Flaked maize | 1.038 | 5.5 | 137 | — |
| 8. | 3.2 kg Malt 0.8 kg extruded maize | 1.038 | 5.8 | 93 | — |
| 9. | 3.2 kg Malt 0.8 kg Flaked maize | 1.038 | 5.8 | 99 | — |
| 10. | 3.2 kg Malt 0.8 kg High Temp. maize | 1.038 | 5.30 | 87 | 281 |
| 11. | 3.2 kg Malt 0.8 kg High Temp. Barley | 1.038 | 5.25 | 153 | 269 |
| 12. | 3.2 kg Malt 0.8 kg Low Temp. Barley | 1.038 | 4.5 | 145 | 216 |
| 13. | 4.0 kg Malt | 1.038 | 4.7 | — | — |
| 14. | 4 kg High Temp. Barley | 1.038 | 6.6 | — | 269 |
| 15. | 3.2 kg Malt 0.8 kg High Temp. Barley | 1.038 | 5.2 | — | 269 |

Test 1 to 3 were essentially concerned only with the head retention value and Tests 13 to 15 with yield.

In Tests 1 to 3 the malt was all from one source, in Test 4 to 12 it was all from a different source and in Tests 13 to 15 it was all from another different source. Any barley used was all from the same batch. In other words the raw materials were of equal quality as far as possible.

For Tests 4 to 15 the malt was weighed out in equal batches of 3.2 Kgs except for the control where 4 Kgs were used. Each sample of adjunct was mixed and weighed out in 0.8 Kg samples.

3.2 Kg of malt and 0.8 Kg of adjunct (or in 4 Kgs the control of malt) were placed into a mashing bag which was then inserted into a mashing bucket containing 3 gallons of water at 64° C. The mash was then maintained at as near 68° C. as possible, temperatures being taken every 10 minutes and the thermostat adjusted as required. All the time during mashing (a period of 2 hours) the mash was slowly stirred.

After two hours the stirrer was removed, the heat turned off and the liquid drained into a container. The mash was then spurged with water at 65° C. and the spurging water committed to the container, spurging was continued until the wort (spurged water or filtrate) reached a specific gravity when corrected for temperature at 20° C. of 1.038.

To the wort was then added 1½ grams of hops and the wort boiled for 1 hour. The wort was then allowed to cool and the Specific Gravity was returned to 1.038 at 20° C. by the addition of water. Except in Tests 1,2 and 3. The amount of wort obtained was then measured.

The wort was then seeded with Yeast (type EDME) and moved to a temperature of approximately 68° C. when fermentation started. After vigorous fermentation had ceased enzyme in the form of Ambazyme (Registered Trade Mark) was added and fermentation carried out to completion. The beer was then removed to a cooler room, settled and racked into plastic barrels which were pressurised up to 0.34 bar. Head tests were carried out after 2 weeks according to the method of the ABM Brewing and Food Group as follows:

Apparatus

A foam tube of standard dimensions (2.6–2.8 cm bore, effective length 35 cm) is connected via a cooling coil in a water bath at 20° C. and two needle control valves in parallel to each other to a carbon dioxide cylinder. The foam tube has a side arm, fitted just above a sintered disc, which is attached via a tap to a vacuum supply. The tube has calibration marks at 5 cm, 7.5 cm, 10 cm and 32.5 cm, away from the sintered disc.

Method

The apparatus is assembled and the carbon dioxide supply pressure adjusted to 0.34 Bar. Both needle valves are opened and the carbon dioxide allowed to flow through the apparatus for 10 minutes. One of the needle valves is closed and the other needle valve adjusted so that a column of water up to the 10 cm mark in the foam tube, is just balanced by the carbon dioxide pressure. That is when no water diffuses through the sintered disc and no carbon dioxide bubbles through the water. The water is run off through the side arm at the lower end of the foam tube.

A little of the beer, which has been degassed by standing in a water bath at 20° C. is used to rinse the foam tube. The waste beer is then run off through the side arm. The beer is poured in using a filter funnel to form as small a head as possible.

The level is adjusted to the 10 cm mark by running off the excess. The second needle valve is opened and adjusted so that the head is made to rise to the 32.5 cm mark in 60±5 seconds. When the head reaches the 32.5 cm mark the needle valve is closed.

The foam begins to collapse and the liquid which collects in the bottom of the foam tube makes a clearly defined boundary with the residual foam. The movement of the boundary as it traverses the region between the 5 cm and 7.5 cm mark, is timed with a stop watch.

Foam Stability in (Z) seconds = 1.44 multiplied by the time taken in seconds for the boundary to pass from the 5 cm to the 7.5 cm mark.

For Tests 1 to 3 there was no evening out of the Specific Gravity which explains, the different values for the Specific Gravity for those Tests as compared with the value for Tests 4 to 15.

Where the Specific Gravity is the same then the yield indicates the yield of soluble carbohydrate.

In the column headed "Maltose" the higher the figure the better the destruction of the starch grains. The procedure used for maltose determination was the ferricyanide method given in "Cereal Laboratory Methods", (American Association of Cereal Chemists, St. Paul, Minn., U.S.A.), method 22-15.

So far as concerns distilling, for example, in the production of whisky, gin or vodka the extruded starch product can be used to replace, at least in part, the customary grain and this would be more easily and efficiently converted to alcohol and minimise the production of haze.

We claim:

1. In a process for producing a fermented product from a mash containing malt and a brewing adjunct, the improvement consisting of using as the brewing adjunct an extruded starch product which has been passed through an extruder cooker to attain a temperature in the extruder of from 60° C. through 180° C. at a moisture content of from 12% through 30% by weight and under a pressure of at least 3 bars.

2. The process according to claim 1, wherein the extrusion is carried out at a pressure of at least 50 bars.

3. The process according to claim 1, wherein the extrusion is carried out at a temperature higher than 130° C.

4. The process according to claim 1, wherein the extruded starch product is selected form the group comprising extruded tapioca, potato, complete seeds of a cereal or incomplete seeds of a cereal.

5. The process according to claim 4, wherein the cereal is selected from the group comprising maize, wheat, rice, barley, rye or milo.

6. In a process for producing a fermented product from a mash containing malt and a brewing adjunct, the improvement consisting of using as the brewing adjunct an extruded starch product produced by passing ground whole maize through an extruder cooker to attain a temperature in the extruder of at least 130° C. and a moisture content of from 12% through 30% by weight under a pressure of at least 3 bars.

7. The process according to claim 6, wherein the extrusion is carried out at a pressure of at least 50 bars.

8. In a process for producing a distilled fermented beverage from a mash containing cereal grain and a fermentable adjunct, the improvement consisting of using as the fermentable adjunct an extruded starch product which has been passed through an extruder cooker to attain a temperature in the extruder of from 60° C. through 180° C. at a moisture content of from 12% through 30% by weight and under a pressure of at least 3 bars.

9. The process according to claim 8, wherein the extrusion is carried out at a pressure of at least 50 bars.

10. The process according to claim 9, wherein the extrusion is carried out at a temperature higher than 130° C.

11. The process according to claim 10, wherein the extruded starch product is selected from the group comprising extruded tapioca, potato, complete seeds of a cereal or incomplete seeds of a cereal.

12. The process according to claim 11, wherein the cereal is selected from the group comprising maize, wheat, rice, barley, rye or milo.

* * * * *